Oct. 4, 1955    F. C. ZUCKER    2,719,690
UNIVERSAL TRIPOD HEAD AND TILT BRAKE THEREFOR
Filed Oct. 1, 1952    2 Sheets-Sheet 1
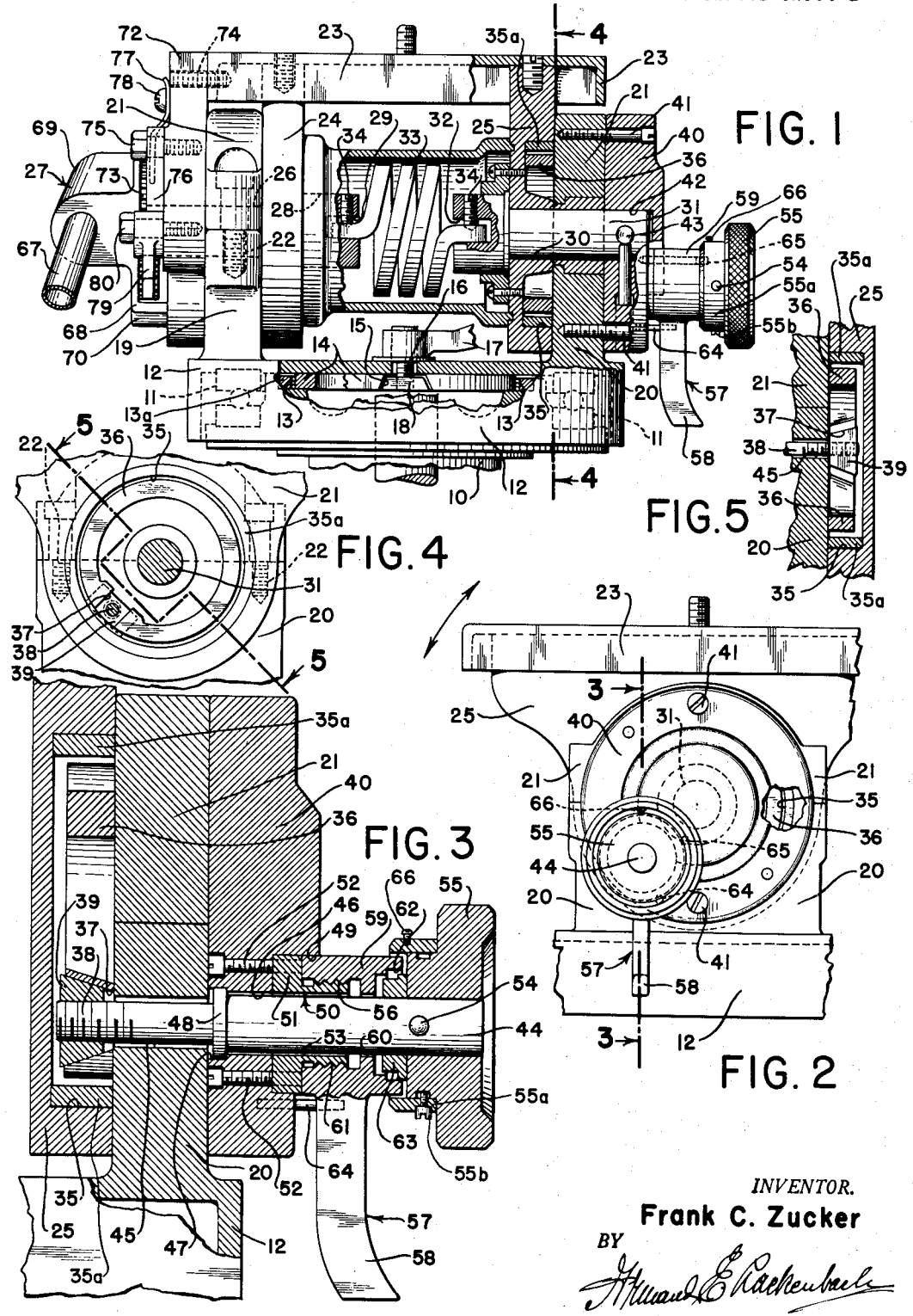
INVENTOR.
Frank C. Zucker
BY
ATTORNEY INVENTOR.
Frank C. Zucker

ATTORNEY

United States Patent Office 2,719,690
Patented Oct. 4, 1955

2,719,690
UNIVERSAL TRIPOD HEAD AND TILT BRAKE THEREFOR

Frank C. Zucker, Lawrence, N. Y.

Application October 1, 1952, Serial No. 312,532

8 Claims. (Cl. 248—183)

This invention relates to universal tripod heads for supporting cameras and other optical apparatus.

The general object of the invention is to provide a simple, novel, universal tripod head having an efficient means for positively locking the head against tilting movement when set in any desired position, and for selectively determining the amount of freedom with which the tripod head may be tilted when no positive lock is immediately desired.

The present invention is particularly suitable for use in connection with the invention disclosed in my co-pending application bearing Serial Number 297,116, filed July 3, 1952, now abandoned. The subject matter of said copending application involves special construction comprising the actual mount of a universal tripod head on which a camera or other optical apparatus may be securely supported. The particular object of the invention described in the copending application is to provide a mount on which a securely supported camera or other optical device may be shifted forwardly or backwardly as necessary, and with relationship, of course, to the universal tripod head, for the purpose of balancing both the optical apparatus and the entire tripod head structure by bringing the common center of gravity within a vertical plane which includes the tilt axis of the head. Generally, the object of the invention described in my copending application is to provide a tripod head mount which is suitable for use with any of a variety of optical apparatuses having different centers of gravity.

In television and other motion picture work various lens, diaphragm, and shutter structures may be selectively employed in connection with a single camera mounted on a universal tripod head. Plainly, when the lens, diaphragm, and shutter structures are changed, the center of gravity of the camera and its supporting head may be radically altered with respect to the tilt axis of the head. Ordinarily a universal tripod head, such as that shown herein by way of example, is provided with a spring-loaded homing device for urging the head to maintain or recover a particular angular position with respect to the tilt axis. This position is usually that in which the focal axis of the camera is horizontal. Such a device necessarily operates effectively only when the center of gravity of the combined camera and head may be projected vertically through the tilt axis of the head.

If the center of gravity of the head and structure supported thereon is moved so that it no longer may be projected through the tilt axis, the homing device is biased and cannot operate to maintain the head and structure thereon, or to return the same, to a prescribed position; and, of course, the head and structure will tilt in a particular direction automatically. Any such condition is extremely inconvenient to an operator. While the invention of the cited copending application provides means for rectifying imbalance either before proper positioning of the center of gravity with respect to the tilt axis or after the center of gravity has been changed with respect to the axis, as by substitution of various elements forming part of the camera or other optical structure, it will be apparent that means for positively locking a universal head against tilt are extremely desirable for use during adjustments to obtain balance.

Thus, a principal object of the present invention is to provide a simple means for positively locking the head and apparatus mounted thereon against tilting movement during adjustments to cure imbalance. It will be understood that even where balance obtains there are many occasions in photography and other optical work when a positive lock may be required.

Another object of the invention is to provide means for selectively braking the homing device relating to the tilt axis of a universal tripod head so that the tilting movement may be rendered more or less difficult, as desired. This object may be primarily related to the readiness with which the entire structure is desired to respond to manipulation by the operator; but it is plain that selective braking of the head is also useful in adjustments to obtain balance.

In motion picture photography the weight of the camera itself, of course, initially may determine the ease of tilting manipulation of a tripod head on which the camera is mounted. Thus, the weight of the camera is a factor which dictates the desirability of a tripod head tilt brake having considerable selectivity as to braking power.

The invention further contemplates a universal tripod head, having the usual spring-loaded homing device for urging the mount to return to a particular angular position when tilted therefrom, and having an operator's handle which may be releasably locked in any of a limited variety of angular positions within a vertical plane whereby the handle may be slightly raised or lowered to suit the convenience of different operators, said handle being adjustable without upsetting the particular angular position of return of the homing device.

These and other objects, features, and advantages of the invention will be more fully understood from the following detailed description and the drawing, in which one form of the invention is shown by way of illustration.

In the drawing:

Fig. 1 is a rear elevational view of a typical universal tripod head, shown partly in section, the plane of the section being vertical and including the tilt axis, and illustrating the application of the mechanism of the present invention to the head;

Fig. 2 is a fragmentary right side elevational view of the same tripod head;

Fig. 3 is a sectional view, much enlarged, according to the index 3—3 of Fig. 2;

Fig. 4 is a fragmentary sectional view according to the index 4—4 of Fig. 1;

Fig. 5 is the section 5—5 of Fig. 4; and

Figure 6:
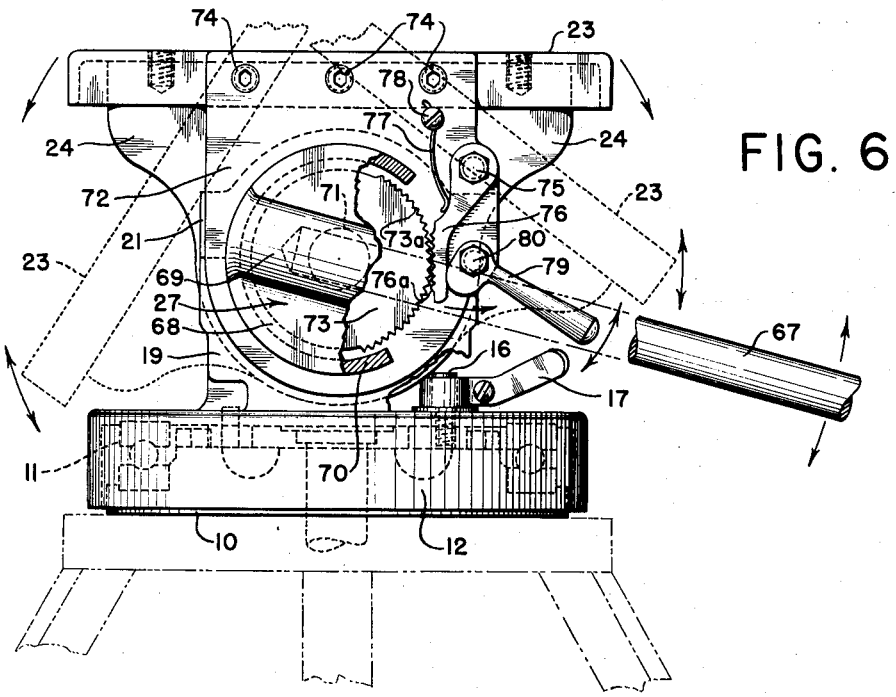
Figs. 6 and 7 are left side elevational views of the tripod head, and show the operator's handle and means for releasably locking the same in any of a limited variety of angular positions within a vertical plane. The means are shown in locked position in Fig. 6 and in unlocked position in Fig. 7.

A typical universal tripod head is shown most clearly in Figs. 1, 2, 6, and 7. The base 10 of the head is adapted in usual manner to be secured to the top of a tripod. Rotatably mounted on the base by means of a ball bearing 11 is a turntable 12. The upper surface of the base is provided with a central counterbore 13 within which an annulus 13a of hardened steel is forcefitted. The inner surface of the annulus serves as a bearing surface for a nearly annular brake shoe 14, preferably of bronze. The brake shoe, when not under centrifugal force, is retracted from general contact with the inner surface of the annulus 13a.

The brake shoe 14 is interrupted by a slot at 15, opposite edges of the slot being beveled, as shown in Fig. 1. Passed freely through the turntable 12 and the slot is a screw 16, the screw having a handle 17 secured to its upper end. Threaded onto the lower portion of the screw 16 beneath the turntable and positioned within the slot at 15 is a wedge-shaped nut 18. By rotating the screw 16 by means of the handle 17 the nut 18 may be fed into the slot at 15 against the bevels thereof for the purpose of expanding the brake shoe 14 so its outer surface engages the inner surface of annulus 13a to brake the turntable against rotary motion relative to base 10.

Other elements of the tripod head are supported by the turntable, and, of course, the turntable provides for selective horizontal angular movement of the head.

Rising from the top of the turntable are two diametrically opposed pillow blocks 19 and 20, which may be integral with the turntable. The blocks are provided with usual caps 21 which are secured by means of screws 22. Pivotally mounted above the turntable so that it may be oscillated on a horizontal axis, i. e., the tilt axis of the tripod head, is a mount 23 for a camera or other optical apparatus. The mount may be functionally similar to that described in my copending application mentioned above, wherein means are provided for securing the optical apparatus to the head and for moving the secured device back or forth, as required, to cure imbalance with respect to the tilt axis. In the present case the mount is shown simply as a platform with a mounting screw, and means for curing imbalance are not included.

In the typical tripod head shown in Figs. 1, 2, 6, and 7, the mount 23 is provided with two oppositely disposed legs 24 and 25 which are secured to the mount by means of screws.

Leg 24 is provided on its outer side with a boss or stub shaft 26 which is journaled in pillow block 19. Secured to the boss or stub shaft 26 beyond the pillow block 19 (i. e., to the left in Fig. 1) is a handle structure generally designated 27. Provided on the inner side of leg 24 is a boss 28 which is coaxial with the boss or stub shaft 26. The boss 28 is slotted at 29. See Fig. 1.

To facilitate manual operation of the tripod head a telescoping handle 67 is provided. See Figs. 1, 6, and 7. The structure of the handle is well known in the art and need not be particularly described. The forward end of the handle is threaded so that it may be screwed into an element 68, the latter forming part of the general handle structure 27. The handle, which, of course, may be used both for rotating the turntable 12, and elements mounted thereof, in a horizontal plane and for tilting the mount 23, is desired to be variable as to length in usual manner and to be releasably locked in any of a limited variety of angular positions within a vertical plane, such angular positions varying with respect to a particular normal angular disposition of the mount 23. The purpose of having the handle variable as to length and releasably lockable on the head in various angular positions, as will be readily understood, is to provide means whereby the handle structure may be adjusted to meet the operational characteristics desired by any of a variety of different operators.

Element 68 may be a casting, and is, essentially, a discoid having on its outer surface a lug 69 which is counterbored and tapped to receive the threaded forward end of the handle, and, on its inner surface, an interrupted peripheral flange 70 and a coaxial boss 71 which is passed rotatably through a plate 72. Rigidly mounted on boss 71 and abutting the inner surface of element 68, is a disk 73 having peripheral teeth 73a on one limb thereof, said limb, as is readily seen in Figs. 6 and 7, extending through less than 180° of the periphery. The plate 72 is rigidly screwed to the left hand side of the mount 23 as at 74. Boss 71 is journaled in plate 72 and is rigidly connected to boss or stub shaft 26, with which it is coaxial, in any suitable manner (not shown). However, it is to be understood that the connection between leg 24 of mount 23 and the handle structure 27 is rigid, and as the handle is moved up and down the mount 23 is tilted.

Figure 7:
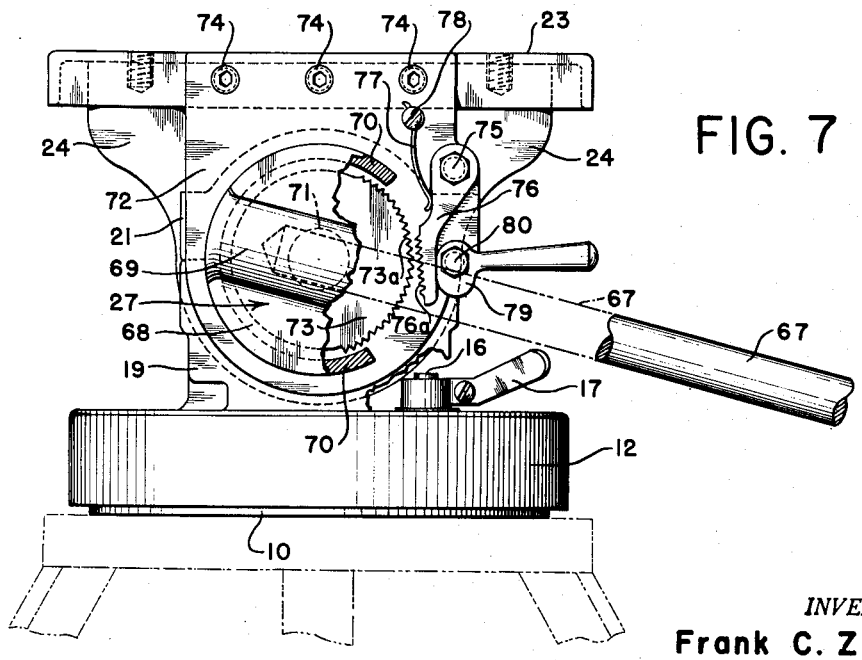

Figs. 6 and 7 show element 68 partly broken away, and partly in section so that the relative positions of the flange 70, and of the disk 73 may be better understood.

Pivotally mounted on plate 72 at 75 is a pawl 76, which may be of any suitable shape, but is here shown to be provided with teeth 76a adapted for engagement with the teeth 73a of disk 73, as shown in Fig. 6. A spring 77, secured at 78 to plate 72, tends to swing pawl 76 out of engagement with the toothed portion of the disk 73, as in Fig. 7. A cam 79, pivotally mounted on plate 72 at 80 may be manually swung against the pawl 76, as in Fig. 6, to force and releasably lock the pawl 76 in engagement with disk 73. Of course, the meshing of the teeth 73a and 76a positively locks the handle structure at that particular angular relationship to the surface of mount 23 obtaining when the cam is depressed as shown in Fig. 6.

Leg 25 is bored at 30 freely to accommodate shaft 31, the bore being coaxial with bosses 26 and 28 of leg 24. Shaft 31 is rotatably received in pillow block 20. The inner end of shaft 31 is of increased diameter and is slotted at 32.

Extending between the slot at 29 in boss 28 and the slot at 32 provided in shaft 31 is a powerful torsion spring 33, the ends thereof being secured within the slots in suitable manner, as by set screws 34.

The outer surface of leg 25 is counterbored at 35 coaxially with the bore at 30. Within the counterbore at 35 is forcefitted another annulus 35a of hardened steel the interior of which operates as a bearing surface for a nearly annular brake shoe 36, preferably of bronze, and normally retracted from general contact with the inner wall of the annulus. The brake shoe 36 is interrupted by a slot at 37, opposite edges of the slot being bevelled, as shown in Figs. 3 and 5. Passed through pillow block 20, eccentrically with respect to the journal provided thereby, and the slot at 37 is a screw 38, more particularly described below. Threaded onto the inner portion of screw 38 inside of leg 25 and within the slot at 37 is another wedge-shaped nut 39. Rotation of screw 38 may feed the nut 39 into the slot at 37 for the purpose of expanding the brake shoe 36 so that its outer surface engages the inner wall of the steel annulus to brake the leg 25, and consequently the mount 23, against rotary motion relative to pillow block 20.

Mounted on the outside of pillow block 20 is a thick plate 40 which is rigidly and non-rotatably secured to the pillow block by means of screws 41. The outer end of shaft 31 extends beyond pillow block 20 and into a counterbore 42 provided on the inner surface of plate 40. A pin 43 passed transversely through the outer end of shaft 31 and keyed in plate 40 prevents rotation of said shaft. Thus an effort to tilt the tripod head necessarily twists the torsion spring 33, and, of course, this spring is essentially the homing device provided for urging the head to maintain a particular angular position with respect to a vertical plane, or the plane of tilt.

Screw 38 is actually the threaded inner end of a shaft 44 (see Fig. 3), which passes freely through bores 45 and 46, respectively, provided in pillow block 20 and plate 40. The inner portion of bore 46 in plate 40 is counterbored at 47, and rotatably received within the counterbore is a flange 48 provided on shaft 44. The depth of the counterbore at 47 is somewhat greater than the thickness of the flange 48 of shaft 44, but the bore 45 of pillow block 20 and the bore 46 of plate 40 are both of less diameter than the flange. Therefore the shaft 44 may have a limited axial movement within the bores 45 and 46 and the counterbore at 47, the amount of such movement available being, of course, equal to the difference between the depth of the counterbore and the thickness of the flange.

The outer portion of bore 46 of plate 40 is also counterbored at 49. Fitted within this counterbore is a member 50, which is of stepped diameter, that part 51 of larger diameter being received within the counterbore and being secured to plate 40 by means of screws 52. The member 50 is provided with a central bore 53 of diameter equal to that of bore 46 of plate 40. Shaft 44 extends outwardly through and beyond member 50, and mounted on the outer extremity of the shaft, and pinned thereto at 54, is a knob 55. Rotatably mounted on knob 55 is an annulus 55a. The annular disposition of this annulus with respect to knob 55 may be locked by means of set screw 55b.

That part 56 of lesser diameter of member 50 is threaded. It is of importance to note here that the directions of the threads of screw 38 and of part 56 of member 50 are opposite. For convenience herein it will be assumed that 38 is a right hand screw.

Threaded onto part 56 of member 50 is a handle 57 which comprises a radial finger grip 58 and a base 59, the latter being bored at 60 to accommodate shaft 44, and countersunk and internally threaded at 61. The base 59 is a cylinder and the inner end thereof fits freely within the outer portion of the counterbore at 49 in plate 40. The base 59 is also countersunk at 62. Mounted on shaft 44 and normally extending partly into the countersink at 62 is a thrust bearing 63. The axial dimension of the base 59 of handle 57 is minutely less than the distance between the outer surface of part 51 of member 50, and the inner surface of knob 55. Therefore, the handle may move a slight distance axially with respect to shaft 44 before the handle engages and jams the knob as the handle is rotated by means of its finger grip 58.

Rigidly mounted on and extending outwardly from plate 40 are two pins, 64 and 65. The first is positioned to be engaged by and to act as a stop for the finger grip 58 for the purpose of limiting rotation of handle 57. Pin 65 is positioned so as to be engaged by a screw or pin 66 provided on the periphery of annulus 55a so as to act as a stop to limit rotation of the knob and shaft 44. In as much as annulus 55a is angularly adjustable on knob 55, the screw or pin 66 may be angularly advanced or retracted to compensate for inaccuracies of manufacture and for wear of the parts.

The ease with which the head may be oscillated on its tilt axis may be varied by selective tightening or loosening of the wedge shaped nut as by rotation of knob 55. Of course the head may be positively locked against oscillation by rotating the knob 55 until the wedge shaped nut so spreads the brake shoe 36 as to jam its outer surface against the inner wall of the annulus 35a. However, it is frequently desired to maintain a certain adjustment of the ease with which the tripod head may be tilted, even though the head be momentarily positively locked against tilt. In order positively to lock the tripod head against tilt, notwithstanding the angular position of knob 55, it is necessary only to rotate the handle 57 until its base 59 jams the inner surface of the knob thereby to bring the wedge shaped nut 39 into positive engagement with brake shoe 36. Thereafter when the handle is moved to released position the adjustment, as of breaking action, which previously obtained, is automatically restored.

It will be plain that many instances occur in photography wherein an absolute lock is desirable as to the inclination of the focal axis. Also, where overthrow in tilt is especially to be guarded against, some degree of braking effect is useful to prevent too ready a tilting movement. Where the easiest tilting movement is desired the knob may be so rotated as to force the wedge-shaped nut into such position (i. e. to the left in Fig. 3) that it has no tendency to spread the brake shoe, whereby the latter has no general contact with the wall of the countersink; and the handle may then be used to lock the head in any tilted position desired.

I claim:

1. In a universal tripod head, a camera mount, rotatable on a horizontal axis, said mount having a circular recess with a peripheral wall centered on said axis; a radially slotted expansible annular brake shoe within said recess; a wedge-shaped nut partly within the slot of said shoe; a shaft rotatably mounted on said head, one end of said shaft being threaded and engaging said nut with the latter normally maintaining said shoe in operative position out of frictional contact with the peripheral wall of said recess; a knob on the other end of said shaft for rotating the same and for feeding said nut farther into said slot to expand said shoe into frictional contact with said peripheral wall; a boss on said head through which said shaft is freely passed, said boss being externally threaded in a direction opposite to that of the threads of said shaft; and a handle, including a handle bar and a handle grip, said handle being rotatably mounted on said shaft between said boss and said knob, and further including a handle base threaded onto said boss, whereby angular movement of said handle may operate to jam said base against said knob to move it and said shaft axially, thereby bringing said nut farther into said slot to expand said shoe into frictional contact with said peripheral wall to lock said head against tilt without respect to rotation of said shaft.

2. The combination of claim 1, including means on said head for predetermining the range of rotary movement of both said shaft and said handle.

3. A universal tripod head comprising a yoke rotatable on a vertical axis; a camera mount supported on said yoke for rotation on a horizontal axis; a circular recess having a peripheral wall in said mount centered on said horizontal axis; a radially slotted expansible annular brake shoe within said recess; a wedge-shaped nut partly within the slot of said shoe; a shaft rotatably mounted on said yoke, one end of said shaft being threaded and engaging said nut with the latter normally maintaining said shoe in operative position out of frictional contact with the peripheral wall of said recess; a knob on the other end of said shaft for rotating the same and for feeding said nut farther into said slot to expand said shoe into frictional contact with said peripheral wall; a boss on said yoke through which said shaft is freely passed, said boss being externally threaded; and a handle, including a handle bar and a handle grip, said handle being rotatably mounted on said shaft between said boss and said knob, and further including a handle base threaded onto said boss, whereby angular movement of said handle may operate to jam said base against said knob to move it and said shaft axially, thereby bringing said nut farther into said slot to expand said shoe into frictional contact with said peripheral wall to lock said yoke against tilt without respect to rotation of said shaft.

4. The combination of claim 3, wherein the direction of the threads of said shaft is in opposition to that of the threads of said boss.

5. A universal tripod head comprising a base; a yoke mounted thereon for rotation on a vertical axis; a camera mount supported by said yoke for rotation on a horizontal axis; a circular recess having a peripheral wall in at least one of the last two elements, said recess being centered on said horizontal axis; a radially slotted expansible annular brake shoe within said recess; a wedge-shaped nut partly within the slot of said shoe; a shaft rotatably mounted on another of the first three elements named, one end of said shaft being threaded and engaging said nut with the latter normally maintaining said shoe in operative position out of frictional contact with the peripheral wall of said recess; a knob on the other end of said shaft for rotating the same and for feeding said nut farther into said slot to expand said shoe into frictional contact with said peripheral wall; a boss on said other element through which said shaft is freely passed, said boss being externally threaded; and a handle, including a handle bar and a handle grip, said handle being rotatably mounted on said shaft between said boss and said knob, and further including a handle base threaded onto said boss, whereby angular movement of said handle may operate to jam said handle base against said knob to move it and said shaft axially, thereby bringing said nut farther into said slot to expand said shoe into frictional contact with said peripheral wall to lock said yoke against tilt without respect to rotation of said shaft.

6. The combination of claim 5, wherein the direction of the threads of said shaft is in opposition to that of the threads of said boss.

7. The combination of claim 5, including means on said other element for predetermining the range of rotary movement of both said shaft and said handle.

8. The combination of claim 5, including another handle for tilting and rotating said yoke respectively about said horizontal axis and about said vertical axis, and means for releasably locking said other handle in any of a variety of angular positions with respect to said camera mount.

References Cited in the file of this patent

UNITED STATES PATENTS

| | | |
|---|---|---|
| 926,392 | Dibbins | June 29, 1909 |
| 1,870,766 | Beistle | Aug. 9, 1932 |
| 1,898,469 | Tonsor | Feb. 21, 1933 |
| 2,111,012 | Tondreau | Mar. 15, 1938 |
| 2,458,872 | Paglinso | Jan. 11, 1949 |